US008355170B2

(12) United States Patent
Tian

(10) Patent No.: US 8,355,170 B2
(45) Date of Patent: Jan. 15, 2013

(54) METHODS AND SYSTEMS TO PROVIDE SCAN SERVICES TO AN IMAGE FORMING DEVICE

(75) Inventor: Lifen Tian, Sunnyvale, CA (US)

(73) Assignee: Ricoh Company, Ltd, Tokyo (JP)

( * ) Notice: Subject to any disclaimer, the term of this patent is extended or adjusted under 35 U.S.C. 154(b) by 169 days.

(21) Appl. No.: 12/843,199

(22) Filed: Jul. 26, 2010

(65) Prior Publication Data

US 2012/0019873 A1    Jan. 26, 2012

(51) Int. Cl.
*H04N 1/04* (2006.01)
*G06K 15/00* (2006.01)

(52) U.S. Cl. ........ 358/1.9; 358/1.15; 358/434; 358/442; 709/230; 709/246

(58) Field of Classification Search ............... 358/1.14, 358/1.15, 402, 407, 442, 474, 434; 709/230, 709/246
See application file for complete search history.

(56) References Cited

U.S. PATENT DOCUMENTS

| | | | | |
|---|---|---|---|---|
| 6,535,914 B1 * | 3/2003 | Pearson et al. | ................ | 709/220 |
| 7,389,516 B2 * | 6/2008 | Rosenbloom et al. | ........ | 719/321 |
| 7,843,586 B2 * | 11/2010 | Ferlitsch | ...................... | 358/1.15 |
| 2002/0124094 A1 * | 9/2002 | Chang et al. | .................. | 709/230 |
| 2003/0233468 A1 * | 12/2003 | Lee | ............... | 709/236 |
| 2004/0061909 A1 * | 4/2004 | Ferlitsch et al. | ............... | 358/474 |
| 2005/0146755 A1 * | 7/2005 | Shimokawa et al. | ........ | 358/453 |
| 2006/0256392 A1 * | 11/2006 | Van Hoof et al. | ............ | 358/402 |
| 2007/0162586 A1 * | 7/2007 | Kim | ............................. | 709/223 |
| 2007/0198732 A1 * | 8/2007 | Mevissen | ..................... | 709/230 |
| 2008/0049644 A1 * | 2/2008 | Halbert | ........................ | 370/254 |
| 2008/0079985 A1 * | 4/2008 | Ferlitsch | ..................... | 358/1.15 |
| 2008/0140861 A1 * | 6/2008 | Kothari et al. | ............... | 709/246 |
| 2009/0015862 A1 * | 1/2009 | Kim | ............................. | 358/1.15 |
| 2010/0027050 A1 * | 2/2010 | Regnier | ..................... | 358/1.15 |
| 2010/0079791 A1 * | 4/2010 | Kim | ............................. | 358/1.15 |
| 2010/0123920 A1 * | 5/2010 | Kusakabe | .................... | 358/1.14 |
| 2010/0315671 A1 * | 12/2010 | Shimazaki | .................. | 358/1.15 |

* cited by examiner

*Primary Examiner* — Kimberly A Williams
(74) *Attorney, Agent, or Firm* — Duft Bornsen & Fishman, LLP

(57) ABSTRACT

Systems and methods are disclosed for scanning devices to exchange scan messages with external devices, where the scan messages comprise WS-Scan protocol message and DSM protocol messages. A determination is made if a scan message comprises a WS-Scan protocol message or a DSM protocol message. A response is made to the WS-Scan protocol message if the scan message is a WS-Scan protocol message. Further, a response is made to the DSM protocol message if the scan message is a DSM protocol message. A user interface of the scanning device hides the distinctions between WS-Scan and DSM to permit a user to seamlessly select scanning to either or both WS-Scan and DSM destinations.

20 Claims, 5 Drawing Sheets

METHODS AND SYSTEMS TO PROVIDE SCAN SERVICES TO AN IMAGE FORMING DEVICE

BACKGROUND

1. Field of the Invention

The invention relates generally to providing scan services to an image forming device, and more specifically, to methods and systems for providing scan services to a scanner in enterprise or business scanning environment.

2. Discussion of Related Art

In a Microsoft Distributed Scan Management environment (DSM), administrators manage scanning services for organizations with many users. DSM is implemented in Windows Server 2008 R2 and uses Web Services on Devices (WSD) protocol to integrate various devices into the environment.

In DSM, the various devices interact with a Microsoft Distributed Scan Server and a Microsoft Scan Management Console to provide solutions for scanning and post processing of scan data. The various devices (e.g., scanners, Multi-Function Printers, etc.), utilize Microsoft Distributed Scan Device (DSD) and Microsoft Distributed Scan Processing (DSP) compliant services to communicate with the Microsoft Distributed Scan Server and the Microsoft Scan Management Console. The DSD specification describes how scanning devices and services operate in a distributed scanning environment, and specify the device control model. The DSP specification describes how the scanning devices, services, and post processing of scan data operate in the DSM environment.

WS-Scan refers to Web Services on Devices (WSD) Scan Service. In WS-Scan, a scanner interacts with a personal computer (the client) to provide scanning solutions. The scanner and client utilize WS-Scan services to communicate with each other to orchestrate the scanning tasks. Because WS-Scan was introduced before DSM, application providers typically choose not to modify existing applications that currently use WS-Scan services, and therefore, a haphazard collection of both DSM and WS-Scan based scanners may be operating in a network. Further, users of the scanner may become easily confused about how to utilize WS-Scan destinations and DSM post scan processing services in such an environment in order to enable a scan workflow.

Thus, it is an ongoing challenge to enable scanning devices to efficiently operate within a DSM and a WS-Scan environment.

SUMMARY

The present invention solves the above and other problems, thereby advancing the state of the useful arts, by providing systems and methods for scanning devices to exchange scan messages with external devices, where the scan messages comprise WS-Scan protocol message and DSM protocol messages. A determination is made if a scan message comprises a WS-Scan protocol message or a DSM protocol message. A response is made to the WS-Scan protocol message if the scan message is a WS-Scan protocol message. Further, a response is made to the DSM protocol message if the scan message is a DSM protocol message. A user interface of the scanning device hides the distinctions between WS-Scan and DSM to permit a user to seamlessly select scanning to either or both WS-Scan and DSM destinations.

One aspect hereof provides for a scanner. The scanner comprises a scan engine, a communication interface, and a processing system coupled with the scan engine and the communication interface. The scan engine is operable to generate scan data. The communication interface is operable to communicate scan messages to a device external to the scanner, where the scan messages comprise WS-Scan protocol messages and DSM protocol messages. The processing system is operable to execute a scan service, where the scan service comprises a protocol processing module operable to determine if a scan message comprises a WS-Scan protocol message or a DSM protocol message. The scan service is further operable to respond to the WS-Scan protocol message if the scan message is a WS-Scan protocol message, and further operable to respond to the DSM protocol message if the scan message is a DSM protocol message.

Another aspect hereof provides for a method operable on a scanner for processing scan messages. According to the method, scan messages are communicated to a device external to the scanner, where the scan messages comprise WS-Scan protocol messages and DSM protocol messages. A determination is made if a scan message comprises a WS-Scan protocol message or a DSM protocol message. If the scan message is a WS-Scan protocol message, then a response to the WS-Scan protocol message is made. If the scan message is a DSM protocol message, then a response to the DSM protocol message is made.

BRIEF DESCRIPTION OF THE DRAWINGS

The same reference number represents the same element or same type of element on all drawings.

DETAILED DESCRIPTION OF THE DRAWINGS

FIGS. 1 through 5 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
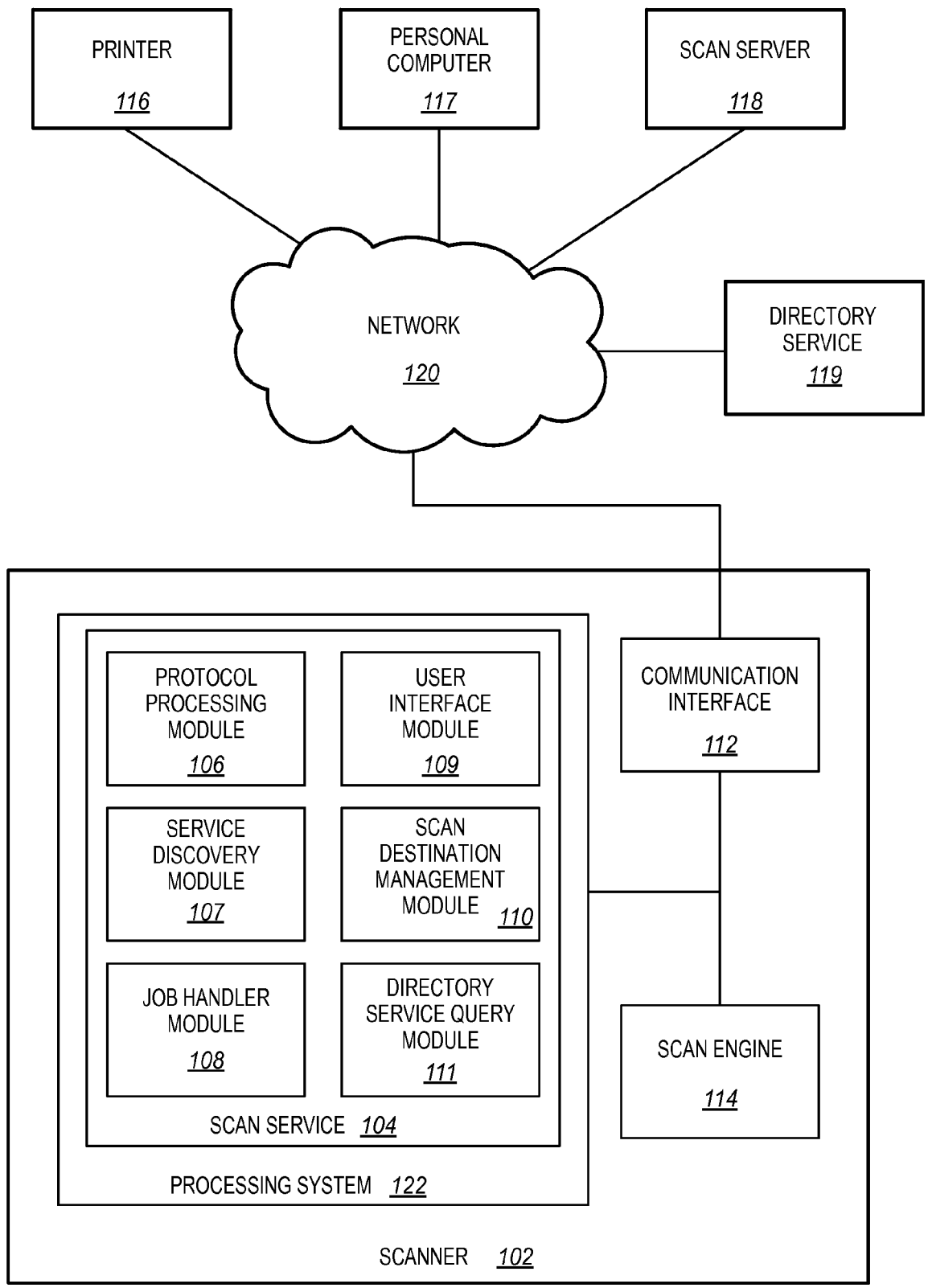
FIG. 1 is a block diagram of a scanner operating a scan service for processing scan messages in an exemplary embodiment.

FIG. 1 is a block diagram of a scanner 102 operating a scan service 104 (e.g., utilizing a processing system 122 executing scan service 104) for processing scan messages in an exemplary embodiment. Scanner 102 further includes a communication interface 112 operable to communicate scan messages through network 120 to one or more external devices 116-119, such as a printer 116 (e.g., operable to print scan data received from scanner 102), a personal computer 117, a scan server 118, and a directory service 119. Scanner 102 further includes a scan engine 114 operable to generate scan data. Scan service 104 includes various modules 106-111 for communicating scan messages to the external devices 116-119. More specifically, the various modules 106-111 implement the service role of WS-Scan, the service role of DSD, and the client role of DSP. Scan service 104 accepts WS-Scan and DSD requests from clients such as personal computer 117 and initiates DSP requests to scan server 118. In order to take full advantage of close relationship between WS-Scan and DSM, scan service 104 centralizes protocol processing and scan job handling functionalities. Scan service 104 also manages the scan destinations and directory service queries (e.g., to directory service 119) that were previously distinctive in WS-Scan and DSM to provide users consistent and seamless interactions with the services offered by WS-Scan and DSM. Further, scan service 104 may be configured to implement stand-alone WS-Scan or DSM capabilities to users as desired. For example, scan service 104 may be configured to implement WS-Scan capabilities in some implementations where only WS-Scan capabilities are desired, and further configured to implement DSM capabilities where only DSM capabilities are desired.

A protocol processing module 106 within scan service 104 parses and processes both WS-Scan and DSD requests. Protocol processing module 106 communicates with job handler module 108 and scan engine 114 to retrieve a list of active and inactive scan jobs, status of a specific job, and validate scan tickets. Protocol processing module 106 also processes ws-eventing subscription creation requests (Subscribe), query (GetStatus) requests, and update (Renew, Unsubscribe) requests and sends out notifications to clients (e.g., personal computer 117) in compliance with WS-Scan architecture when the subscribed events occur. To streamline the scan and post scan process, protocol processing module 106 interacts with job handling module 108 and generates requests to scan server 118 in compliance with DSM architecture for post scan job information after scan engine 114 finishes physical scanning and the scan data is available. Protocol processing module 106 also subscribes to scan server 118 in compliance with DSM architecture for post scan job status events, and notifies job handler module 108 of the updated post scan job status.

A service discovery module 107 within scan service 104 listens for the client's ws-discovery messages (e.g., from personal computer 117) in compliance with WS-Scan architecture, sends a response to indicate the presence and endpoint of the WS-Scan service, and notifies the client of any metadata changes. Service discovery module 107 also probes for scan server 118 in compliance with DSM architecture, retrieves scan server 118 metadata, and circulates the scan server 118 services and capabilities among other modules 106-111.

A directory service query module 111 contacts directory service 119 (e.g., Active Directory services (AD) on a Windows platform) in compliance with DSM architecture, via a directory query protocol to obtain scan related settings that a user of scanner 102 is authenticated to access. For example, an administrator may define a Post Scan Process (PSP) for storage in directory service 119 and for use by scan service 104. PSPs include scan settings, post scan instructions such as uploading scan data to a FTP site, sending emails including the scan data, and transferring scan data to a shared network folder. Directory service query module 111 then passes the scan ticket part of such data to job handling module 108 for validation and physical scanning by scan engine 114. Directory service query module 111 then passes the scan destination part of data to a scan destination management module 110 of scan service 104 for caching the information and further parsing of the information. In an enterprise environment, administrators configure and associate scan settings, scan destinations, post scan instructions, etc., with users or departments (roles) using Post Scan Processing (PSP) objects stored in directory service 119.

Scan destination management module 110 manages WS-Scan destinations as well as DSM destinations. The WS-Scan destinations are registered by clients via ws-eventing Subscribe messages, which protocol processing module 106 helps to parse and extract destinations from. DSM destinations are predefined by administrators and supplied by directory service query module 111 after performing a query of directory service 119 with a user's credentials. Regardless of underlying protocol of WS-Scan and DSM destination registration, scan destination management module 110 identifies key fields that are associated with destinations, and therefore simplifies the destination mapping. For example, WS-Scan destinations registered by the same client need not be duplicated. Similarly, DSM destinations retrieved from the same scan server (e.g., scan server 118) typically have unique names. Therefore, scan destination management module 110 uses a combination of client IP address and destination names for WS-Scan destination, and a combination of scan server 118 and destination names for DSM destination identification, as shown in the following sample scan destination entries of tables 1 and 2 below.

TABLE 1

Registered scan destinations.

| Scan Destination (Post-Scan Process) Name | Client (Scan Server) ID |
|---|---|
| Scan to Lab PC | 1 |
| Scan to Lab Print | 2 |
| QADeptGeneral | 3 |
| QADeptGrayScale | 3 |
| ... | ... |

TABLE 2

Scanner communicated client (Scan Server).

| Client (Scan Server) ID | Client IP (Scan Server Name) |
|---|---|
| 1 | 123.45.6.789 |
| 2 | 123.45.6.890 |
| 3 | qa.abc.com |
| ... | ... |

Tables 1 and 2 illustrate the use of exemplary database tables and structures for associating scan destinations (WS-Scan and DSM destinations) with client/server addresses. For example, table 1 illustrates that 'scan to lab pc' is associated with a client ID of 1 corresponding with a client IP address of 123.45.6.789 and "scan to lab print" is associated with a client ID of 2 which corresponds to a client IP address of 123.45.6.890. Tables 1 and 2 allow for the elimination of duplicate entries for destinations that match the same IP address. Scan service 104 analyzes tables 1 and 2 to determine if a selected destination is a WS-Scan destination or a DSM destination (e.g., by determining if the destination is a client IP address or a scan server name) and take the appropriate action.

Figure 2:
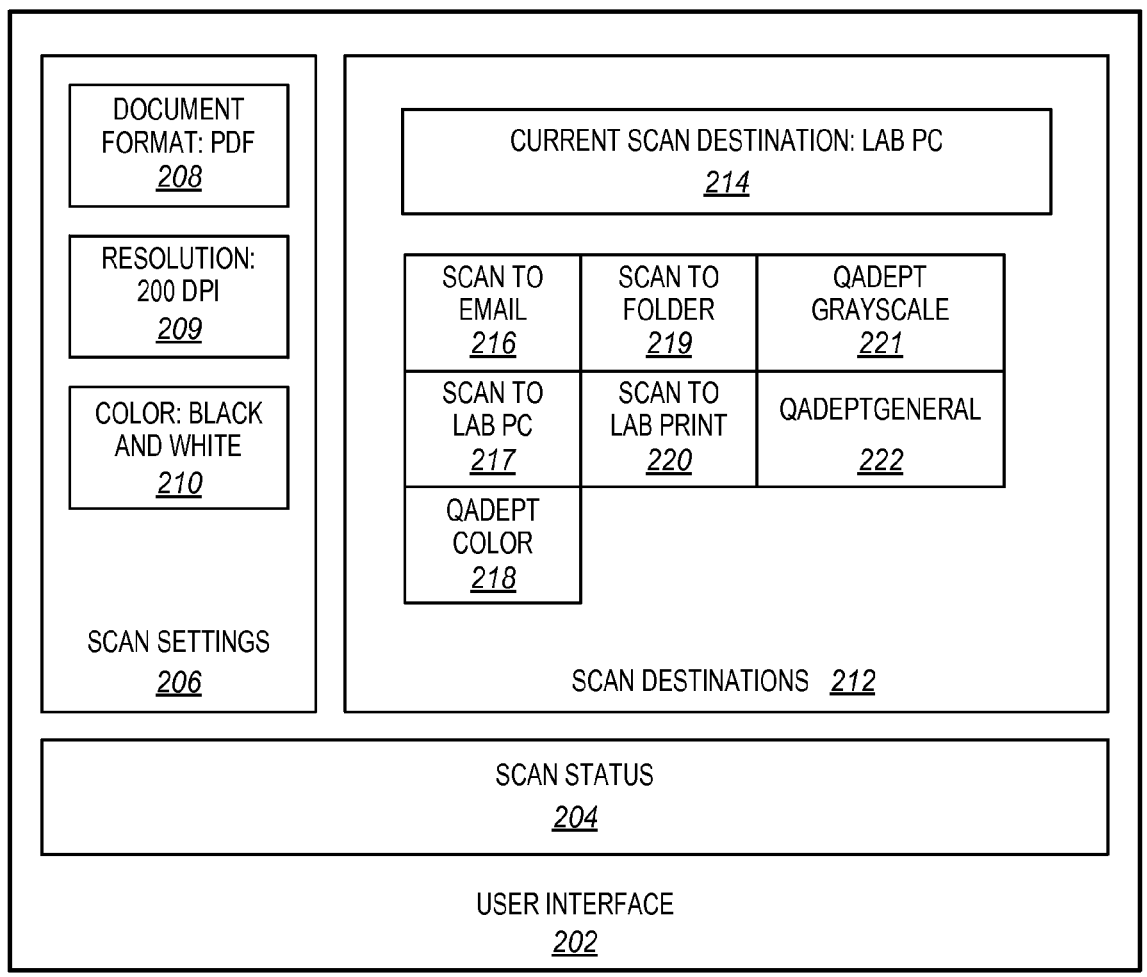
FIG. 2 is an illustration of a user interface for a scanner for utilizing the scan service of FIG. 1 in an exemplary embodiment.

A user interface module 109 of scan service integrates with other modules 106-108 and 110-111, and presents to the user a simple user interface combining both WS-Scan and DSM destinations so as to provide the user a transparent scan service experience. FIG. 2 is an illustration of a user interface for scanner 102 (see FIG. 1) for utilizing the scan service 104 of FIG. 1 in an exemplary embodiment. Since the post scan processing is integrated with the normal scan workflow in scan service 104, user interface module 109 (see FIG. 1) shows the authenticated user his/her own scan jobs with end-to-end status, including physical scanning, image transferring to post scan processing progress, a final state at scan server 118 (see FIG. 1), and at final scan data destinations. FIG. 2 illustrates a number of possible user-interface fields that an authenticated user may interact with scan service 104 through, including scan status 204, scan settings 206, and scan destinations 212. User interface 202 may be presented to a user on scanner 102 as a touch screen for displaying information to the user, or other suitable display device and/or combination of user inputs, such as a keyboard, buttons, a mouse, etc. User interface 202 may also show customized information for individual users (e.g., preferred scan settings, a user's job history with user selected fields such as a document name, a destination name, error message information, etc.) Scan status 204 indicates to the user the status of any scan jobs at different processing stages, such as physical scanning, image data delivery, post scan processing, etc. Scan settings 206 allows the user to define the settings for creating a scan job, such as the document format 208 (e.g., PDF in the example), a resolution 209 (e.g., 200 dots per inch in the example), and whether color or black and white scanning is selected by color 210 (e.g., black and white is selected in the example). Scan settings 206 also displays the scan settings as part of the scan process as defined by an administrator and retrieved by directory service query module 111. Scan destinations 212 allows the user to identify a current scan destination 214 (e.g., lab pc in the example). Further, scan destinations 212 allows the user to select a combination of WS-Scan and DSM destinations, such as scan to email 216, scan to lab PC 217, scan to folder 219, scan to lab print 220, QADeptGrayScale 221 post processing and/or QADeptGeneral 222 post processing. Further, user interface 202 may allow the user to select multiple final scan data destinations combining both WS-Scan and DSM destinations. The specific details of defining and configuring the settings for such WS-Scan and DSM destinations are well known to those skilled in the art and therefore will not be discussed here. Further, although scan service 104 has been described using specific modules, one skilled in the art will recognize that the modules may be combined or decomposed into other embodiments as a matter of design choice.

Figure 3:
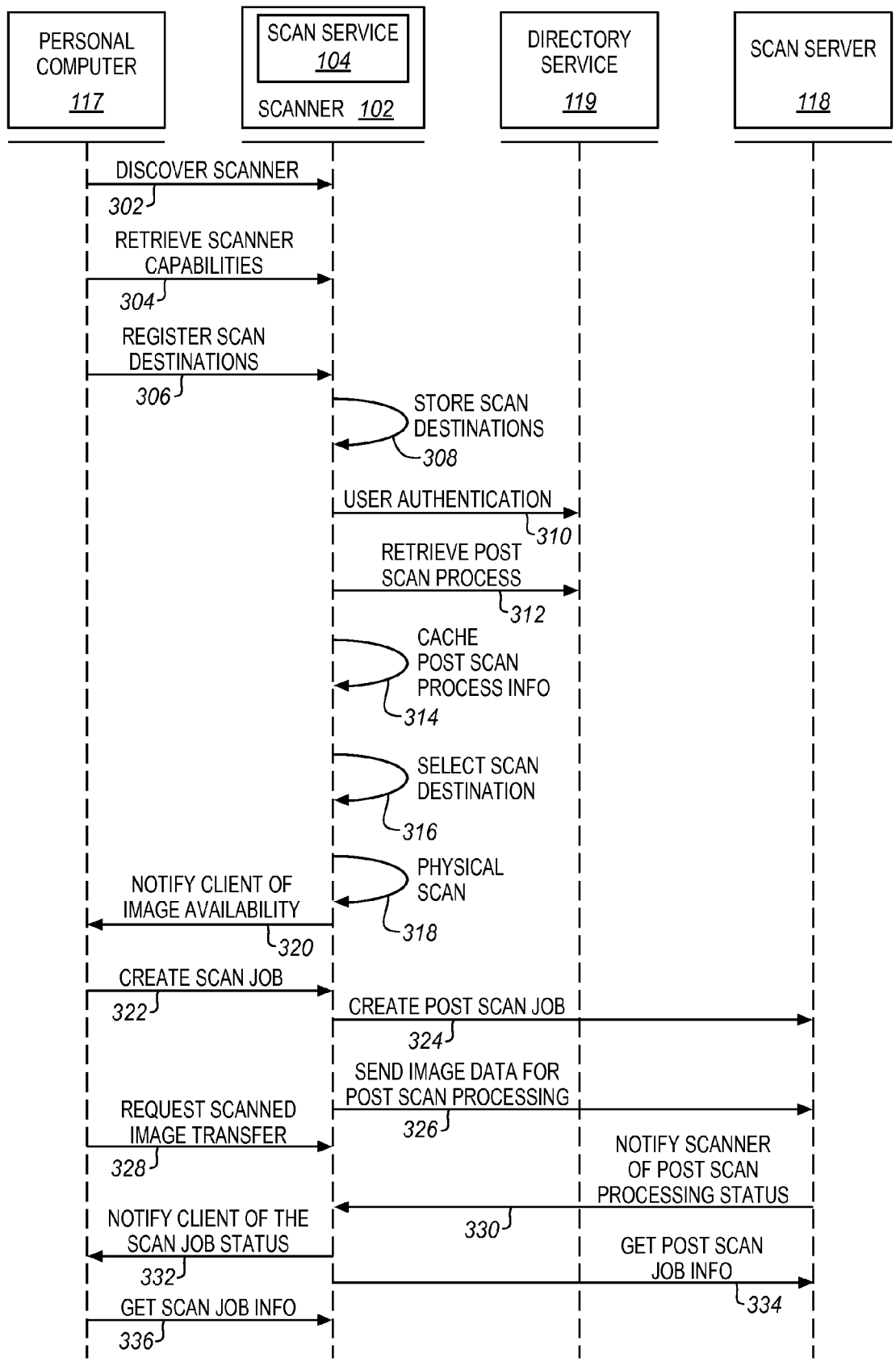
FIG. 3 illustrates a communication and processing flow utilizing the scan service of FIG. 1 in an exemplary embodiment.

As WS-Scan focuses on scan job creation and DSM is directed more toward post scan processing, scan service 104 supports integrated WS-Scan and DSM user scenarios to allow the user to control all aspects of a scan process. FIG. 3 illustrates a communication and processing flow utilizing the scan service of FIG. 1 in an exemplary embodiment. In FIG. 3, scan service 104 interfaces with personal computer 117 (although one skilled in the art will understand that personal computer 117 may also include servers, smart phones, etc.), scanner 102, directory service 119, and scan server 118 for scan services and scan destination functions in a combination of WS-Scan and DSM messages and process flows. In FIG. 3, the dashed lines represent time flows between the corresponding devices shown along the top of FIG. 3. In FIG. 3, communication and processing flows 302, 304, 306, 308, 320, 322, 328, 332, and 336 represent WS-Scan protocol messages and processes. Communication and processing flows 310, 312, 314, 324, 326, 330, and 334 represent DSM protocol messages and processes, and communication and processing flows 316 and 318 represent a common set of WS-Scan and DSM protocol messages and processes. Personal computer 117 utilizes ws-discovery messages to discover scanner 102 in step 302. Personal computer 117 then retrieves scanner capabilities 304 from scanner 102 (e.g., color depth, resolution, etc.). Personal computer 117 then registers scan destinations 306 with scanner 102. In step 308, scanner 102 stores scan destinations. A user may then authenticate on scanner 102 to directory service 119 (e.g., using user authentication 310) and retrieve a set of post scan processes 312 from directory service 119 available to the user. Scanner 102 caches post scan process information 314 for fast recovery of the information when needed by scanner 102. The user may then select a scan destination 316 on scanner 102 (e.g., using user interface 202 of FIG. 2). After the user specifies the scan settings and initiates a scan, scanner 102 starts physical scanning 318 of originals and transfers the scanned image to both scan server 118 for post scan processing and personal computer 117 for verification or storage. For example, scanner 102 notifies personal computer 117 of image availability 320 and receives a scan job 322 from personal computer 117. Scanner 102 may also inform personal computer 117 that scanner 102 is ready to generate scan data (i.e., step 320 may occur before step 318). In addition, scanner 102 creates a post scan job 324 for post scan processing of the image data at scan server 118, and sends image data for post scan processing 326 to scan server 118. Scan server 118 may, for example, perform an Optical Character Recognition (OCR) post processing activity on the scan data while allowing the client (e.g., personal computer 117) to simultaneously view the original scan data. For example, personal computer 117 may request scan image transfer 328 from scanner 102 while scanner 102 is communicating with scan server 118 for post processing activities (e.g., receive post processing status 330 message and get job information 334 message). Scanner 102 may then notify personal computer 117 of the scan job status 332 and allow personal computer 117 to get the scan job information 336.

FIG. 3 is illustrative in nature and depicts one possible embodiment for the various communication and processing flows for scan service 104. One skilled in the art will recognize that the various communication and processing flows may include more or fewer flows as a matter of design choice. Thus, the operation of scan service 104 is not limited to the specific flows depicted in FIG. 3.

Figure 4:
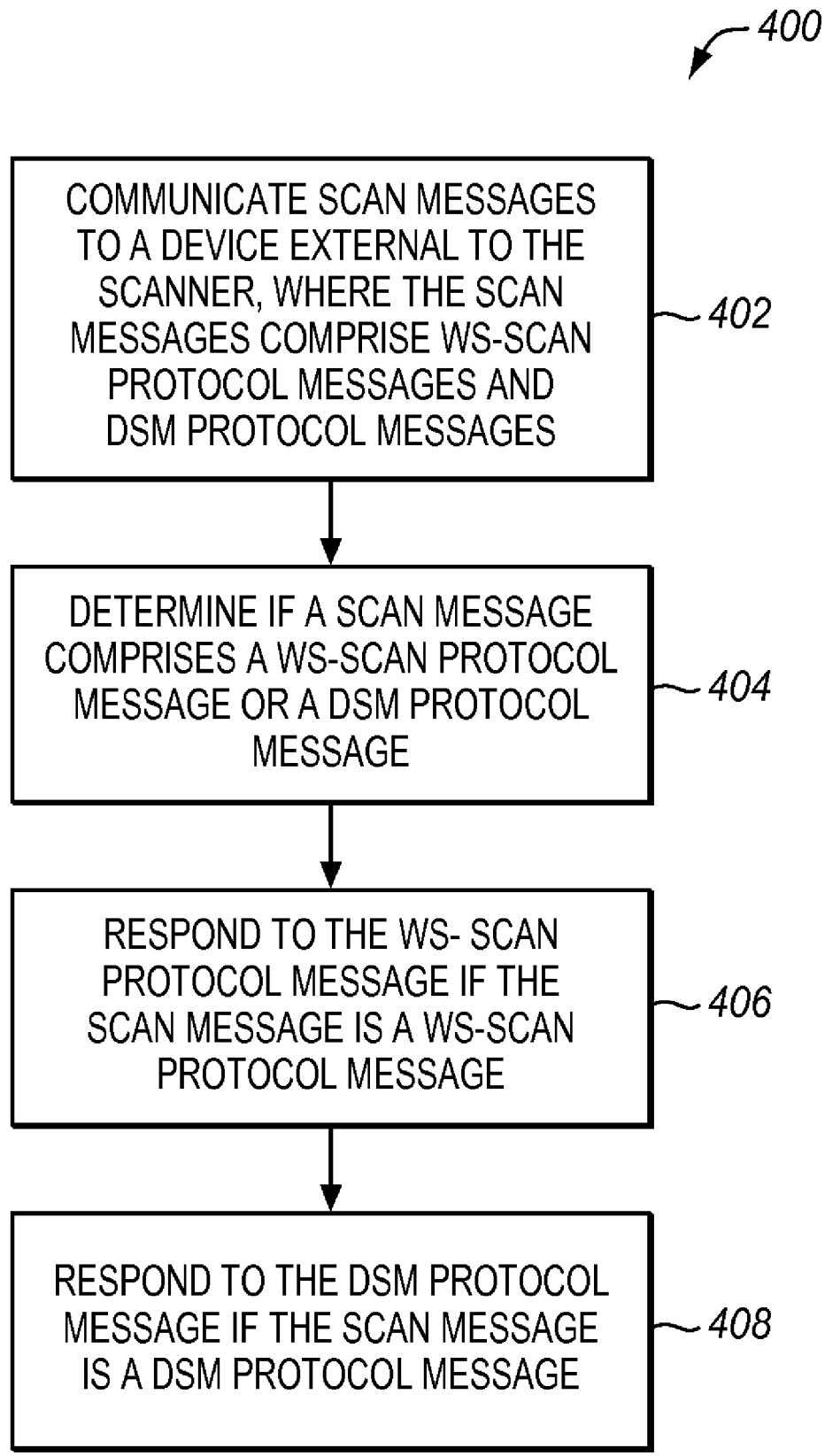
FIG. 4 is a flow chart describing a method for processing scan messages in an exemplary embodiment.

FIG. 4 is a flow chart describing a method 400 for processing scan messages in an exemplary embodiment. Step 402 comprises communicating scan messages to a device external to the scanner, where the scan messages comprise WS-Scan protocol messages and DSM protocol messages. For example, the scan message may comprise ws-discovery messages from a client, ws-eventing Subscribe messages for registering a WS-Scan destination, messages for locating a DSM scan server (via ws-discovery Probe messages), messages for locating a DSM scan destination, ws-transfer messages for metadata retrieval, and ws-transfer messages to query a scan server's metadata.

Step 404 comprises determining if a scan message comprises a WS-Scan protocol message or a DSM protocol message. The determination may, for example, comprise analyzing headers of scan messages to determine if the messages are WS-Scan protocol messages or DSM protocol messages.

Step 406 comprises responding to the WS-Scan protocol message if the scan message is a WS-Scan protocol message. For example, if in step 404 it was determined that the scan message was a ws-discovery message, step 406 may comprise transmitting a response to the originator of the ws-discovery message to indicate a presence of an endpoint of a WS-Scan service. Further, if in step 404 it was determined that the scan message was a ws-eventing Subscribe message, then step 406 may comprise registering the WS-Scan destination(s).

Step 408 comprises responding to the DSM protocol message if the scan message is a DSM protocol message. For example, if in step 404 it was determined that the scan message was a message for locating a DSM scan destination, step 406 may comprise transmitting scan data to the DSM scan destination. Further, if in step 404 it was determined that the scan message was a message from a DSM scan server indicating a post scan job status notification, then step 406 may comprise utilizing the post scan job notification to update information related to the current state of the post scan job.

FIG. 4 depicts an exemplary method in order to teach one skilled in the art how to make and use the invention disclosed herein. One skilled in the art will recognize that the steps illustrated in FIG. 4 may be expanded or combined in various ways as a matter of design choice. Also, one skilled in the art will recognize that the steps illustrated in FIG. 4 may be embodied as programmed instructions executable by a processing system such as processing system 122 and by other systems operable to perform the functionality disclosed for scanner 102 herein.

Figure 5:
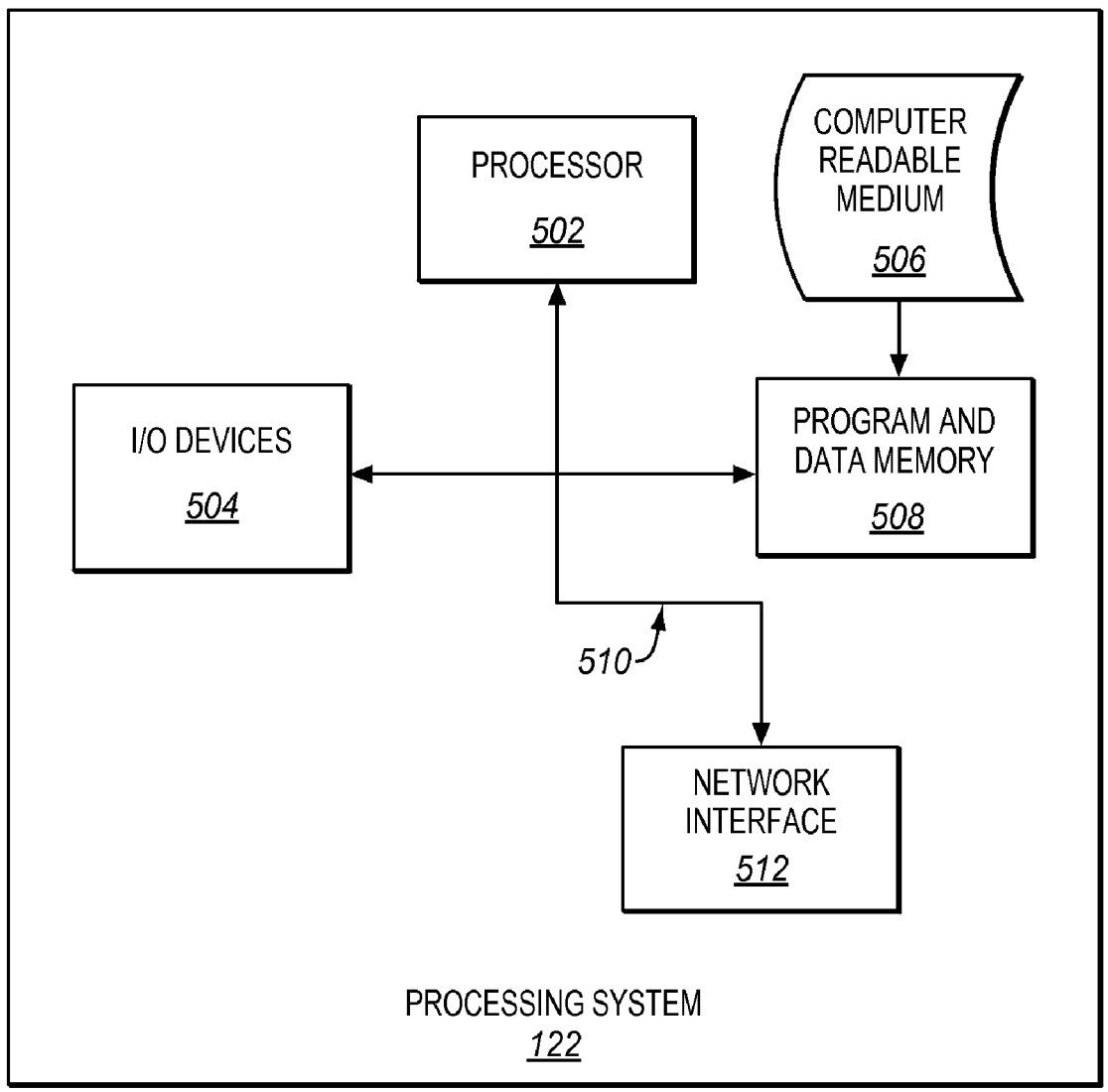
FIG. 5 is a block diagram of a computing system on which a computer readable medium may be used to receive program instructions for a method to provide processing of scan messages in an exemplary embodiment.

FIG. 5 is a block diagram of a modular decomposition of processing system 122 of FIG. 1 adapted to provide scan services by executing programmed instructions and accessing data stored on a computer readable storage medium 506 in an exemplary embodiment.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium 506 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A processing system 122 suitable for storing and/or executing program code will include at least one processor 502 coupled directly or indirectly to memory elements 508 through a system bus 510. The memory elements 508 can include local memory employed during actual execution of the program code, bulk storage, and cache memories that provide temporary storage of at least some program code in order to reduce the number of times code must be retrieved from bulk storage during execution.

Input/output or I/O devices 504 (including but not limited to keyboards, displays, pointing devices, scan engines, etc.) can be coupled to the system either directly or through intervening I/O controllers. Network adapter interfaces 510 may also be coupled to the system to enable processing system 122 to be coupled with other data processing systems or storage devices through intervening private or public networks. Modems, cable modems, IBM Channel attachments, SCSI, Fibre Channel, and Ethernet cards are just a few of the currently available types of network or host interface adapters.

Although specific embodiments were described herein, the scope of the invention is not limited to those specific embodiments. The scope of the invention is defined by the following claims and any equivalents thereof.

I claim:

1. A scanner comprising:
   a scan engine operable to generate scan data;
   a communication interface operable to communicate scan messages with a device external to the scanner, the scan messages comprising Web Services on Devices (WSD) Scan Service (WS-Scan) protocol messages and Distributed Scan Management (DSM) protocol messages; and
   a processing system coupled with the communication interface and coupled with the scan engine, the processing system operable to execute a scan service, the scan service comprising:
      a protocol processing module operable to process a header of a scan message received from the device external to the scanner to determine if the scan message comprises one of a WS-Scan protocol message and a DSM protocol message, further operable to respond to the device external to the scanner utilizing the WS-Scan protocol if the scan message is a WS-Scan protocol message, and further operable to respond to the device external to the scanner utilizing the DSM protocol if the scan message is a DSM protocol message.

2. The scanner of claim 1 wherein the scan service further comprises:
   a service discovery module operable to determine if the scan message comprises a ws-discovery message from a client, and further operable to transmit a response to the client to indicate a presence of an endpoint of a WS-Scan service responsive to the determination,
   wherein the service discovery module is further operable to locate a DSM scan server, and further operable to identify post processing capabilities of the located DSM scan server.

3. The scanner of claim 2 wherein the scan service further comprises:
   a user interface module operable to allow a user to direct the scan engine to scan a document to generate the scan data, further operable to allow the user to select a post processing capability of the located DSM scan server, and further operable to transmit the scan data to the located DSM scan server for post processing of the scan data in accordance with the selected post processing capability.

4. The scanner of claim 2 wherein the scan service further includes:
   a job handling module operable to determine if the scan message comprises a scan job for the WS-Scan service endpoint, and further operable to direct the scan engine to scan a document to generate the scan data based on settings in the scan job.

5. The scanner of claim 1 wherein the scan service further comprises:
   a directory service query module operable to locate a DSM scan destination; and
   a scan destination management module operable to determine if the scan message comprises a ws-eventing Subscribe message for registering a WS-Scan destination, and further operable to register the WS-Scan destination responsive to the determination, wherein the scan destination management module is further operable to register the DSM destination located by the director service query module.

6. The scanner of claim 5 wherein the scan web service further comprises:

a user interface module operable to allow a user to direct the scan engine to scan a document to generate the scan data, further operable to allow the user to select at least one of the registered WS-Scan destination and the registered DSM scan destination for the scan data, and further operable to transmit the scan data to the selected destination.

7. The scanner of claim 6 wherein the user interface module is further operable to allow the user to select both the registered WS-Scan destination and the registered DSM scan destination for the scan data, and further operable to transmit the scan data to the registered WS-Scan destination and the registered DSM scan destination.

8. A method operable on a scanner for processing scan messages, the method comprising:

communicating scan messages with a device external to the scanner, the scan messages comprising Web Services on Devices (WSD) Scan Service (WS-Scan) protocol messages and Distributed Scan Management (DSM) protocol messages;

processing a header of a scan message received from the device external to the scanner to determine if the scan message comprises one of a WS-Scan protocol message and a DSM protocol message;

responding to the device external to the scanner using the WS-Scan protocol if the scan message is a WS-Scan protocol message; and responding to the device external to the scanner using the DSM protocol if the scan message is a DSM protocol message.

9. The method of claim 8 further comprising:

determining if the scan message comprises a ws-discovery message from a client;

transmitting a response to the client to indicate a presence of an endpoint of a WS-Scan service responsive to the determination;

locating a DSM scan server; and identifying post processing capabilities of the located DSM scan server.

10. The method of claim 9 further comprising:

scanning a document to generate scan data;

selecting a post processing capability of the located DSM scan server; and transmitting the scan data to the located DSM scan server for post processing of the scan data in accordance with the selected post processing capability.

11. The method of claim 9 further comprising:

determining if the scan message comprises a scan job for the WS-Scan service endpoint; and scanning a document to generate the scan data based on settings in the scan job.

12. The method of claim 8 further comprising:

locating a DSM scan destination;

determining if the scan message comprises a ws-eventing Subscribe message for registering a WS-Scan destination;

registering the WS-Scan destination responsive to the determination; and registering the located DSM scan destination.

13. The method of claim 12 further comprising:

scanning a document to generate scan data;

selecting at least one of the registered WS-Scan destination and the registered DSM scan destination for the scan data; and transmitting the scan data to the selected destination.

14. The method of claim 13 further comprising:

selecting both the registered WS-Scan destination and the registered DSM scan destination for the scan data; and transmitting the scan data to the selected scan destinations.

15. A non-transitory computer readable medium tangibly embodying programmed instructions which, when executed by a computing system, are operable for perform a method of processing scan messages, the method comprising:

communicating scan messages with a device external to the scanner, the scan messages comprising Web Services on Devices (WSD) Scan Service (WS-Scan) protocol messages and Distributed Scan Management (DSM) protocol messages;

processing a header of a scan message received from the device external to the scanner to determine if the scan message comprises one of a WS-Scan protocol message and a DSM protocol message;

responding to the device external to the scanner using the WS-Scan protocol if the scan message is a WS-Scan protocol message; and responding to the device external to the scanner using the DSM protocol if the scan message is a DSM protocol message.

16. The non-transitory computer readable medium of claim 15, wherein the method further comprises:

determining if the scan message comprises a ws-discovery message from a client;

transmitting a response to the client to indicate a presence of an endpoint of a WS-Scan service responsive to the determination;

locating a DSM scan server; and identifying post processing capabilities of the located DSM scan server.

17. The non-transitory computer readable medium of claim 16, wherein the method further comprises:

scanning a document to generate scan data;

selecting a post processing capability of the located DSM scan server; and transmitting the scan data to the located DSM scan server for post processing of the scan data in accordance with the selected post processing capability.

18. The non-transitory computer readable medium of claim 16, wherein the method further comprises:

determining if the scan message comprises a scan job for the WS-Scan service endpoint; and scanning a document to generate the scan data based on settings in the scan job.

19. The non-transitory computer readable medium of claim 15, wherein the method further comprises:

locating a DSM scan destination;

determining if the scan message comprises a ws-eventing Subscribe message for registering a WS-Scan destination;

registering the WS-Scan destination responsive to the determination; and registering the located DSM scan destination.

20. The non-transitory computer readable medium of claim 19, wherein the method further comprises:

scanning a document to generate scan data;

selecting both the registered WS-Scan destination and the registered DSM scan destination for the scan data; and transmitting the scan data to the selected destinations.

* * * * *